United States Patent [19]
Cordera et al.

[11] Patent Number: 5,707,448
[45] Date of Patent: Jan. 13, 1998

[54] APPARATUS FOR THE APPLICATION OF PARTICULATES TO BAKED GOODS AND SNACKS

[75] Inventors: Robert J. Cordera, East Amherst, N.Y.; Henry M. Andreski, Whippany, N.J.

[73] Assignee: Nabisco Technology Company, Wilmington, Del.

[21] Appl. No.: 641,258

[22] Filed: Apr. 30, 1996

Related U.S. Application Data

[62] Division of Ser. No. 266,285, Jun. 27, 1994, Pat. No. 5,514,399.

[51] Int. Cl.[6] .................................................. A23G 3/00
[52] U.S. Cl. .......................... 118/13; 118/19; 118/24; 118/30; 118/417; 118/DIG. 4; 99/494; 198/659; 222/413; 366/196; 366/310
[58] Field of Search ........................ 118/13, 19, 24, 118/30, 417, DIG. 4; 426/289, 292, 295, 96, 293; 366/309, 310, 196; 99/494; 198/659; 222/412, 413

[56] References Cited

U.S. PATENT DOCUMENTS

| | | | |
|---|---|---|---|
| 2,402,986 | 7/1946 | Cunning | 118/19 |
| 2,844,469 | 7/1958 | Melnick et al. | 426/116 |
| 3,049,750 | 8/1962 | Austin | 366/300 X |
| 3,198,655 | 8/1965 | Gisiger | 188/24 X |
| 3,408,980 | 11/1968 | Benson | 118/19 |
| 3,484,250 | 12/1969 | Vollink et al. | 99/83 |
| 3,527,646 | 9/1970 | Scheick et al. | 99/166 |
| 3,556,411 | 1/1971 | Nord et al. | 239/581 |
| 3,647,147 | 3/1972 | Cook | 239/599 |
| 3,659,787 | 5/1972 | Ito | 239/15 |
| 3,661,605 | 5/1972 | Rubin et al. | 106/244 |
| 3,919,969 | 11/1975 | Leverett | 118/13 |
| 4,038,422 | 7/1977 | Keyser et al. | 426/72 |
| 4,079,151 | 3/1978 | Schade et al. | 426/96 |
| 4,168,919 | 9/1979 | Rosen et al. | 366/173 |
| 4,192,418 | 3/1980 | Montgomery | 198/659 |
| 4,301,763 | 11/1981 | Goldstone et al. | 427/180 X |
| 4,335,149 | 6/1982 | Stipp | 426/366 |
| 4,346,849 | 8/1982 | Rood | 239/597 |
| 4,367,242 | 1/1983 | Jarvis et al. | 426/793 |
| 4,419,953 | 12/1983 | Fowler | 118/16 |
| 4,430,003 | 2/1984 | Beattie et al. | 366/173 |
| 4,431,678 | 2/1984 | Sollich | 426/306 |
| 4,477,483 | 10/1984 | Lewis | 118/19 X |
| 4,504,502 | 3/1985 | Earle et al. | 426/293 |
| 4,543,907 | 10/1985 | Fowler | 118/19 |
| 4,614,162 | 9/1986 | Ryan et al. | 118/19 |
| 4,640,837 | 2/1987 | Coleman et al. | 426/94 |
| 4,658,708 | 4/1987 | Rastoin | 99/323.9 |
| 4,762,725 | 8/1988 | Player et al. | 426/582 |
| 4,801,465 | 1/1989 | Sponer | 426/116 |

(List continued on next page.)

OTHER PUBLICATIONS

Perry, *Chemical Engineers' Handbook*, 4th ed., McGraw Hill, pp. 21–46 (undated).

*Primary Examiner*—Laura Edwards

[57] ABSTRACT

Substantially uniform distribution of a particulate composition such as a seasoning or spice, on both the top and bottom surfaces of baked good or snack pieces is achieved by applying the composition as a curtain or sheet from within a housing as the substrate pieces are transported and tumbled by counterrotating brushes. The curtain or sheet extends in the direction of the longitudinal axis of the longitudinal cavity through which the substrate pieces are transported. The apparatus includes a housing having a raised portion for enclosing and permitting the curtain or sheet to disperse in a direction transverse to the longitudinal axis of the housing cavity as the composition descends towards the baked good or snack pieces. A lowered portion, downstream of the raised portion of the housing prevents escape of airborne particulate composition to the atmosphere through the baked good or snack piece outlet. The particulate composition dispenser preferably comprises a series of adjustable nozzle openings for providing a particulate curtain or sheet having a substantially uniform mass flow rate along its length.

11 Claims, 3 Drawing Sheets

OTHER PUBLICATIONS

| Patent No. | Date | Inventor | Class |
|---|---|---|---|
| 4,831,959 | 5/1989 | Turner | 118/363 |
| 4,834,996 | 5/1989 | Fazzolare et al. | 426/302 |
| 4,910,031 | 3/1990 | Budd et al. | 426/96 |
| 4,913,919 | 4/1990 | Cornwell et al. | 426/94 |
| 4,960,199 | 10/1990 | Lassiter, Jr. et al. | 198/494 |
| 4,960,600 | 10/1990 | Kester et al. | 426/310 |
| 4,972,934 | 11/1990 | Lassiter, Jr. et al. | 198/370 |
| 4,981,707 | 1/1991 | Morris | 426/93 |
| 4,985,269 | 1/1991 | Irvin et al. | 426/560 |
| 5,038,910 | 8/1991 | Lassiter, Jr. et al. | 198/349.6 |
| 5,085,877 | 2/1992 | Youcheff et al. | 426/100 |
| 5,090,593 | 2/1992 | Ejike | 222/1 |
| 5,120,559 | 6/1992 | Rizvi et al. | 426/446 |
| 5,130,150 | 7/1992 | Averbach | 426/99 |
| 5,135,766 | 8/1992 | Hermsen et al. | 426/427 |
| 5,160,016 | 11/1992 | Moksnes | 198/53 |
| 5,195,454 | 3/1993 | Wadell | 118/16 |
| 5,202,137 | 4/1993 | Duffy et al. | 426/89 |
| 5,225,222 | 7/1993 | Cha et al. | 426/89 |
| 5,275,830 | 1/1994 | Smith | 426/93 |
| 5,275,831 | 1/1994 | Smith et al. | 426/93 |
| 5,298,268 | 3/1994 | Maegli | 426/93 |
| 5,316,195 | 5/1994 | Moksnes et al. | 222/146.6 |
| 5,372,826 | 12/1994 | Holtz et al. | 426/93 |
| 5,385,086 | 1/1995 | Burns et al. | 222/412 X |
| 5,386,939 | 2/1995 | Ruegg | 239/7 |
| 5,401,518 | 3/1995 | Adams et al. | 426/89 |
| 5,433,961 | 7/1995 | Lanner et al. | 426/93 |
| 5,435,430 | 7/1995 | Steiner et al. | 198/370.5 |
| 5,443,964 | 8/1995 | Norman et al. | 426/303 |
| 5,520,457 | 5/1996 | Gontero et al. | 118/24 |
| 5,538,747 | 7/1996 | Mueller | 118/19 |
| 5,554,221 | 9/1996 | Center et al. | 118/19 |

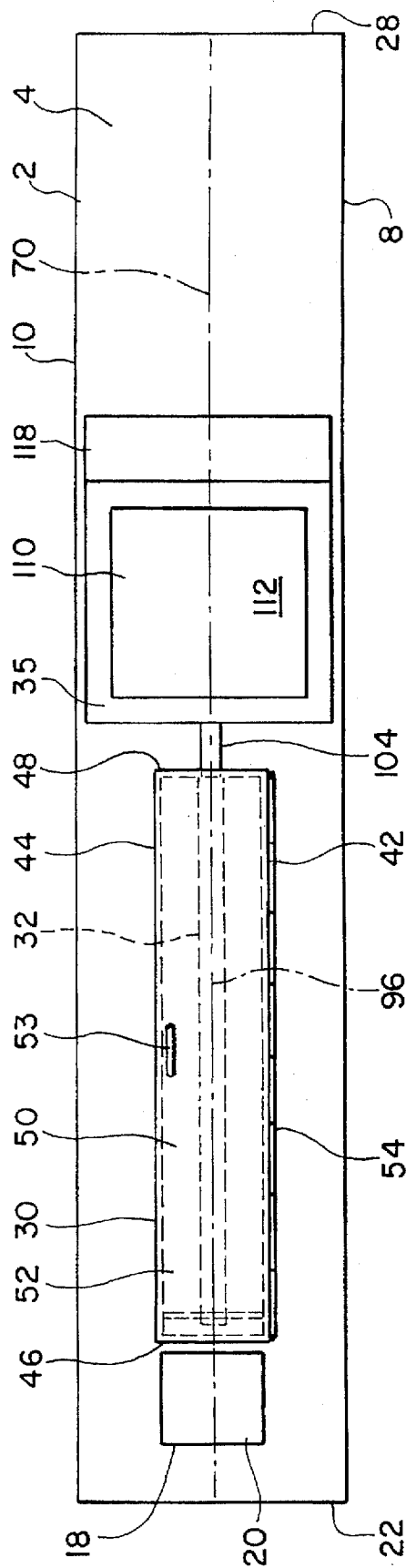
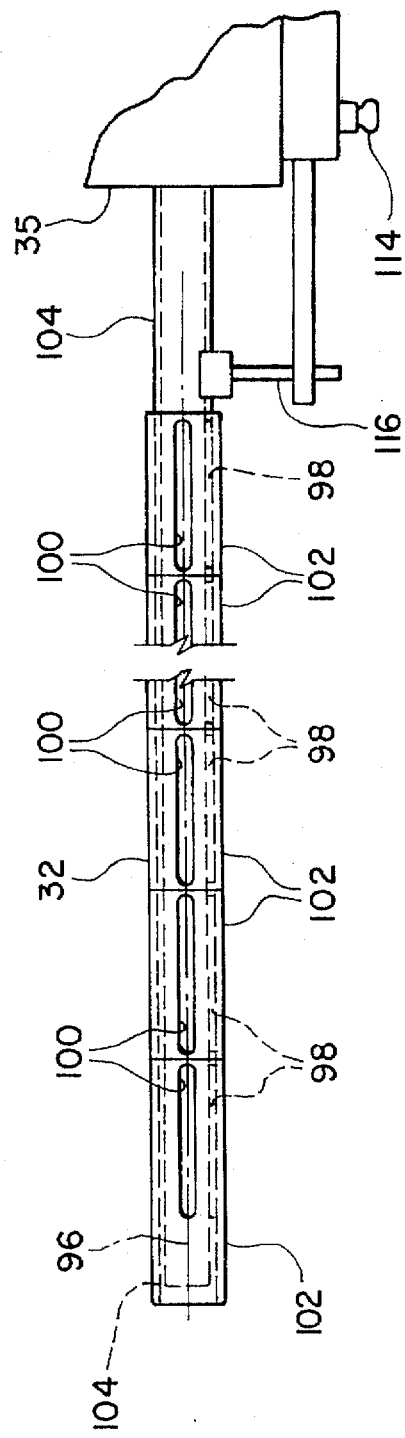
FIG. 2
FIG. 6

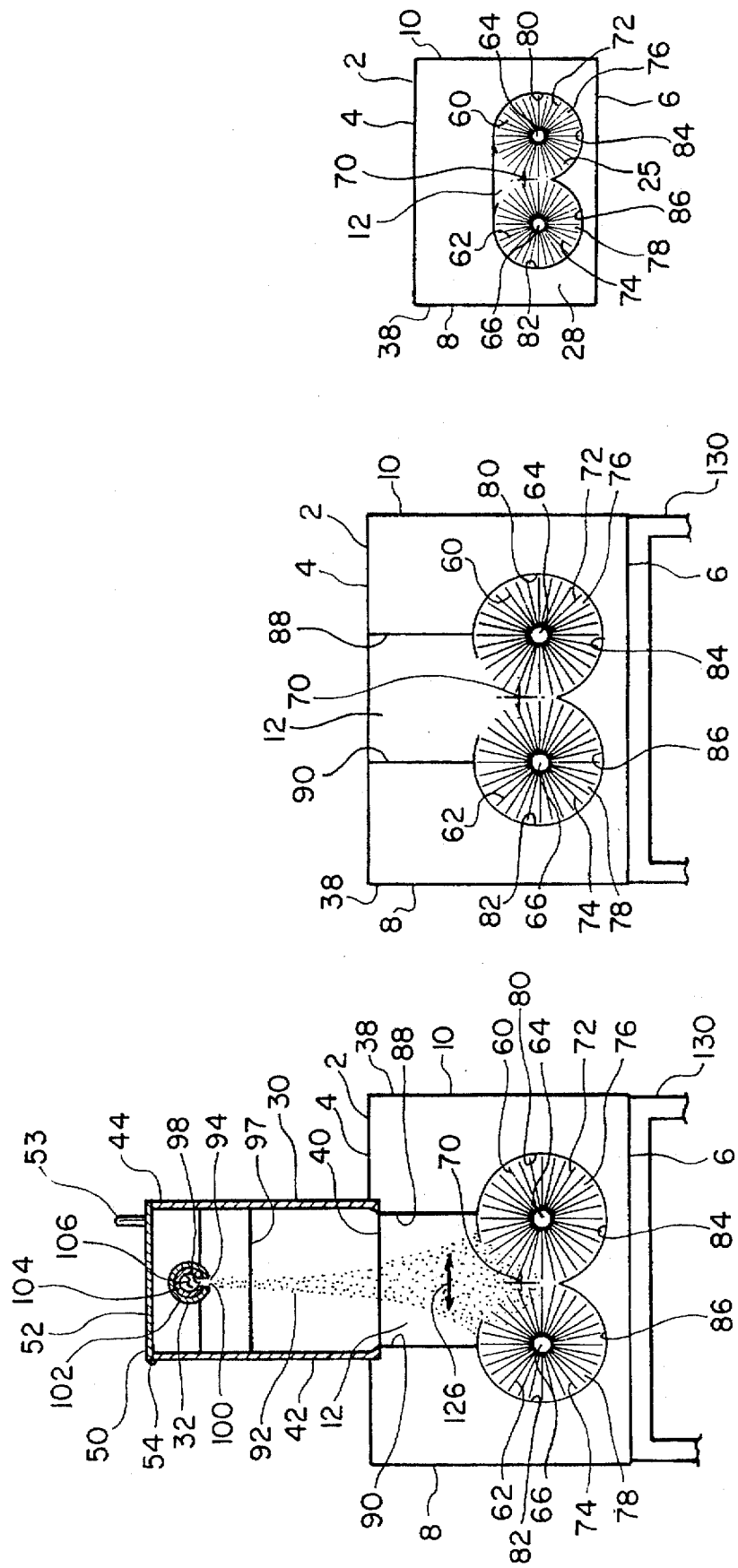

APPARATUS FOR THE APPLICATION OF PARTICULATES TO BAKED GOODS AND SNACKS

This is a divisional of application Ser. No. 08/266,285, filed on Jun. 27, 1994 now U.S. Pat. No. 5,514,399.

FIELD OF THE INVENTION

This invention relates to apparatus and a method for the topical application of particulate compositions, such as seasonings, to baked good pieces and snacks.

BACKGROUND OF THE INVENTION

In the mass production of baked goods such as crackers or savory snacks, topping materials may be continuously applied to a dough sheet or dough pieces prior to baking to promote adhesion of the particulate composition to the moist dough. However, in the pre-baking application of toppings, it is generally only practical to coat only one side of the product because of the conventional transfer of doughs on flat conveyor belts to and through a continuous oven. Furthermore, heat-sensitive seasonings may be adversely affected in terms of flavor, appearance, or texture by the baking process. The post-baking application of toppings avoids the destruction of heat sensitive ingredients. However, the application of toppings to baked goods while they are on a conveyor belt still only achieves a one-sided coating.

In either the pre-baking or post-baking topical application of particulate compositions, the compositions are dispensed by a dispenser which extends across the conveyor belt or band. This arrangement dispenses particulate topping compositions, such as salt, in a relatively narrow band across the belt so as to coat the dough or baked good product below. However, dispensing a particulate composition upon a product while it is being conveyed on a conveying band generally results in the wasting of product unless the substrate is in sheet form or the pieces are closely spaced so that the particulate ingredient falls primarily upon the intended substrate.

Furthermore, the topical application of particulate ingredients which are sufficiently light, fine, or of low specific gravity so as to become airborne upon dispensing presents additional problems. For example, the escape of airborne particulates to the bakery atmosphere is wasteful. Also, the airborne particulates may be undesirably incorporated into or onto other baked goods which may be under production in a nearby bakery line. Vacuum hoods may be used to collect airborne particulates. However, such systems may be difficult to adapt to or configure to a conveyor belt system with high collection efficiency. In addition, the application of a vacuum to the dough prior to baking or just after baking may cause undesirable surface drying or moisture gradients which can adversely affect texture, appearance, or checking.

Toppings my be applied to both sides of a baked good by tumbling the baked good pieces while dispensing the topping upon the pieces. For example, inclined, rotating drums may be used to transport and tumble baked good pieces while dispensing a topping material thereupon. This type of system is generally used in conjunction with an oil based topping which is readily sprayed onto the pieces. However, rotating drums, particularly used at low rotational speeds to avoid product breakage, often do not result in substantially uniform coating of both sides of the pieces when particulates are dispensed upon them. With no separate means of agitating the pieces, they tend to layer or cover each other or tend to flip or tumble with too little frequency to provide desirable coverage.

Baked good tumbling and conveying with agitation of the pieces and of the topping composition may be achieved with conveyors equipped with counterrotating conveyor brushes. However, the delivery of particulate toppings onto the product has been by means of generally vertical, inverted Y-shaped robes. These generally Y-shaped tubes deliver the particulates to a localized area and require the use of compressed air to disperse the particulates. This system has been found to result in uneven product coverage with large areas being uncovered with seasoning and other areas having too highly concentrated seasoning. Furthermore, the use of pressurized air to disperse the particulate composition results in excessive losses of the generally highly expensive seasoning composition as well as contamination of other product lines.

The present invention provides an apparatus and method for the topical application of a particulate composition, such as a seasoning, substantially uniformly to the top surface and to the bottom surface of baked good pieces, such as crackers, biscuits, wafers, and sweet or savory snacks. The substantially uniform coating of the individual pieces is achieved without substantial product breakage, without the need for pressurized air to disperse the particulate composition, with line or no waste of particulate composition and without substantial contamination of other product lines by airborne particulates. The apparatus and process provides for the topical application of particulates on a mass production, continuous basis without adversely affecting flavor, appearance, or texture of heat-sensitive toppings. Finely granulated, or low specific gravity particulate ingredients, such as dried vegetable, herb, or spice flakes may be continually dispersed to obtain consistent, uniform baked good coverage without substantial particulate waste or contamination of nearby product lines.

SUMMARY OF THE INVENTION

The present invention provides an apparatus and a method for the topical application of a particulate composition to opposing major surfaces of baked good pieces or snack pieces. Both the tops and bottoms of a plurality of baked good or snack pieces are coated substantially uniformly with the particulate composition on a consistent, continuous, mass production basis. In embodiments of the present invention, the baked good pieces may be transferred from a multi-zone, continuous band oven to a spray oil applicator for the application of topping oil or other edible liquid adhesive composition. The baked good pieces may then be transferred by means of a conventional conveyor to the housing of the apparatus for applying the particulate composition. A particulate dispenser or metering device dispenses the particulate composition as a curtain or sheet. The curtain or sheet descends upon the baked good pieces as they are tumbled and transported by counterrotating conveying brushes located in the stationary housing.

The rotational axes of the counterrotating brushes are each substantially parallel to the longitudinal axis of the longitudinal cavity formed by the walls of the housing. The curtain or sheet of particulate composition extends for a substantial distance along the longitudinal axes of the longitudinal cavity and brushes. In embodiments of the invention, the curtain or sheet my extend a distance of at least twenty percent, generally about twenty-five percent to about sixty percent of the length of the counterrotating brushes. The longitudinal orientation of the curtain distributes or meters the topping composition over a greater number and greater area of baked good surfaces than would be achieved with a curtain oriented transverse to the direction of transport of the pieces between the inlet and outlet.

In preferred embodiments of the invention, the housing containing a raised portion or hood for permitting the curtain or sheet to disperse in a direction transverse to the longitudinal axis of the housing cavity. Also, the provision of a lowered portion in the housing which is downstream of the raised portion helps to prevent the escape of airborne particulates from the housing to the atmosphere through the housing outlet. The raised portion preferably houses a dispenser nozzle which includes a plurality of adjustable openings along its length for providing a substantially uniform mass flow rate of particulate composition along the length of the curtain or sheet.

A preferred dispenser nozzle comprises a tubular member which includes a feed screw for transporting the particulate composition through the tubular member from one end to the other. The tubular member may contain inner slots or passageways along its bottom. Mass flow rate adjustment of the particulate composition may be achieved by the use of individually adjustable rotatable sleeves each having an outer slot or passageway. Rotation of the individual sleeves rotates its outer slot relative to the inner slot so that the width of the inner slot which is covered by the sleeve is varied, thereby controlling mass flow through each nozzle opening.

The apparatus of the present invention may be used to provide particulate coatings, such as seasonings, spices, herbs, dried or dehydrated vegetable flakes, cheese powder, flavorings, colorants, and odorants to baked good pieces or snacks. Exemplary of baked goods or snacks which may be produced in accordance with the present invention are crackers, biscuits, wafers, chips, or fabricated chip-like snacks, including no-fat, reduced-fat, and low-fat varieties thereof.

BRIEF DESCRIPTION OF THE DRAWINGS

FIG. 2 is a schematic top view of the apparatus of FIG. 1.

FIG. 3 is an enlarged, schematic cross-sectional view of the housing of the apparatus along line 3—3 of FIG. 1.

FIG. 4 is an enlarged, schematic cross-sectional view of the housing of the apparatus along line 4—4 of FIG. 1.

FIG. 5 is a schematic end view of the outlet end of the housing of the apparatus along line 5—5 of FIG. 1.

FIG. 6 is an enlarged, schematic partial side view of the particulate dispenser of FIG. 1 showing the dispenser nozzle.

DETAILED DESCRIPTION OF THE INVENTION

Figure 1:
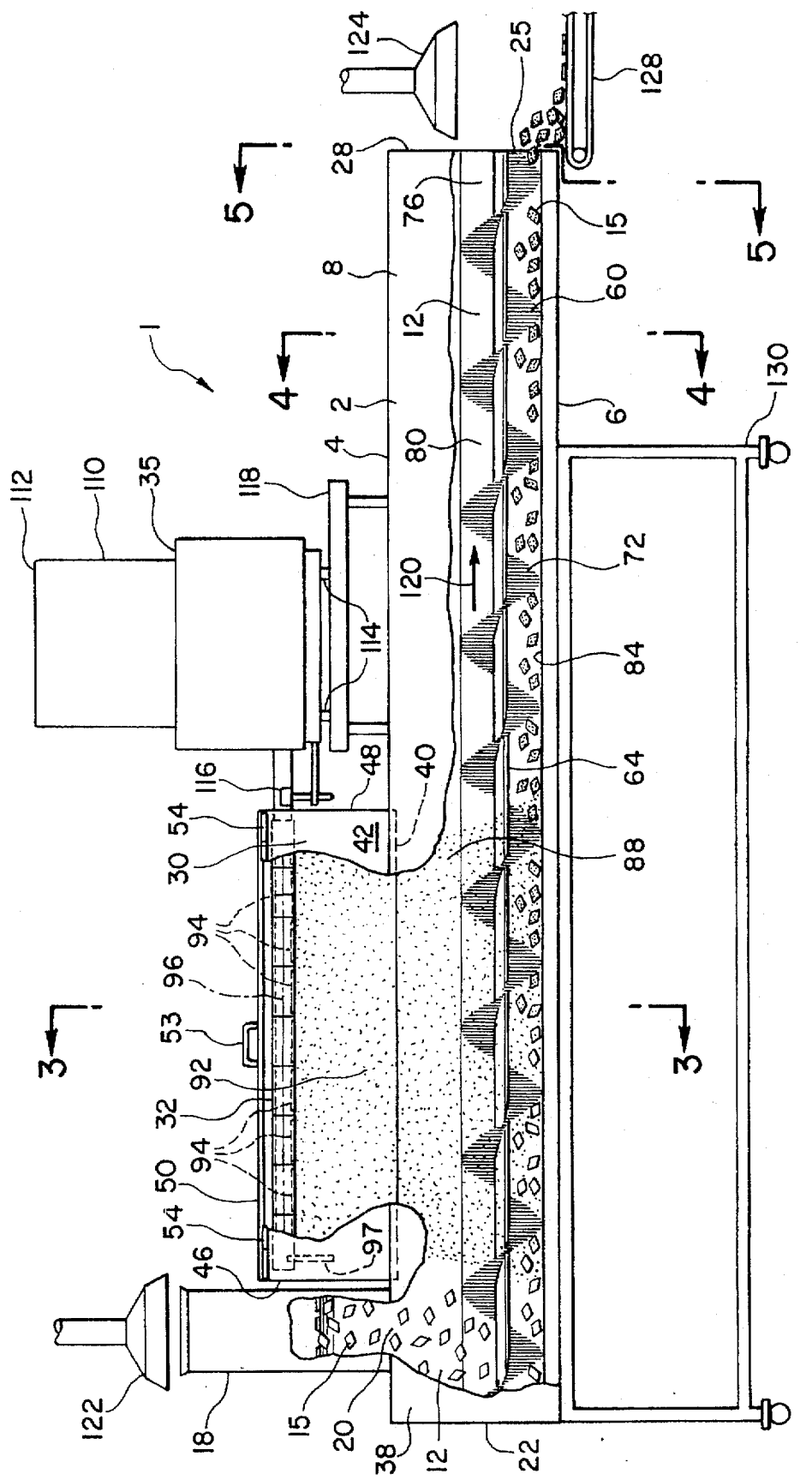
FIG. 1 is a schematic side view of the apparatus for the topical application of particulate compositions to baked goods and snacks in accordance with the present invention.

Consistent, substantially uniform application of a particulate composition to both sides of baked good or snack pieces is achieved in accordance with the present invention by dispensing the particulate composition as a curtain or sheet upon the pieces as they are both tumbled and transported by counterrotating conveyor brushes. The particulate curtain or sheet extends in the direction of transport of the pieces for a substantial distance so as to avoid a concentrated area of introduction of the particulate composition to the substrate pieces. Substantially uniform coverage of the top and bottom surfaces of substantially all pieces is achieved even though the pieces to be topped have a spray off or adhesive coating. Particulate composition dispersion over a large area before it contacts the substrate pieces is obtained without the use of pressurized air. More uniform coverage with substantially lower loss of particulate composition to the atmosphere is accomplished with the longitudinally oriented curtain. Dispersion of the particulate composition in a direction transverse to the direction of transport of the substrate pieces is promoted by the gentle air currents created by the counterrotating brushes and by permitting the particulate composition to fall a substantial distance before reaching the substrate pieces.

As shown in FIGS. 1, 2, 3, 4, and 5, the apparatus 1 for applying toppings in accordance with the present invention comprises a housing 2 having a top wall 4, a bottom wall 6, and two opposing longitudinal side walls 8, 10 for forming a longitudinal cavity 12 within the housing 2. Baked good or snack pieces 15 to be coated with the particulate composition may be supplied via a hopper 18 to the housing inlet 20. The inlet 20 for receiving the baked good pieces 15 into the cavity 12 may be located in the top wall 4 as shown in FIGS. 1 and 2. In other embodiments the inlet 20 may be located in a side wall 8, 10 near the upstream end 22 of the housing 12. The outlet 25 for discharging the coated or topped pieces 15 from the cavity 12 may be located in the outlet end 28 of the housing 2. The cavity 12 is preferably completely enclosed by the housing 2 except for the substrate piece inlet 20 and outlet 25 so as to reduce escape of airborne particulates to the atmosphere.

The housing 2 includes a raised portion or hood 30 as shown in FIGS. 1, 2 and 3. The raised portion 30 accommodates and encloses the particulate dispensing nozzle 32 of a particulate dispenser 35 a substantial distance above the substrate pieces 15 as they are transported within the longitudinal cavity 12. The raised portion or hood 30 may be integral with or separate and removable from the remaining or lower portion 38 of the housing 2. The raised portion or hood 30 may include an open or partially open bottom 40, opposing side walls 42, 44, an upstream end wall 46, a downstream end wall 48, and a top wall 50. The top wall 50 may comprise a lid 52 and lid handle 53 for accessing the dispensing nozzle 32 for making flow adjustments or for maintenance and cleaning. The lid 52 may be completely removable or preferably hinged, such as by hinge 54 to side wall 42. Use of a removable hood or raised portion 30 of the housing 2 facilitates access to the longitudinal cavity 12 and counterrotating brushes 60, 62 located within the housing cavity 12.

The hood or raised portion 30 of the housing 2 for enclosing the dispensing nozzle 32 is preferably located downstream of the inlet 20 for receiving the baked good or snack pieces 15. This arrangement reduces backflow of the particulate composition from the baked good or snack inlet 20. The substantially long portion, for example, about 50% or more of the length, of the lower housing 38 downstream of the raised or hooded portion 30 helps to prevent escape of airborne particulate composition to the atmosphere through the outlet 25. The downstream end wall 48 of the hood 30 and the outlet end wall 28 of the lower housing 38 provide back pressure and resistance to flow of airborne particulates carried by air currents within the housing cavity 12.

The counterrotating brushes 60, 62 are located within the housing 2 for transporting and tumbling the baked good or snack pieces 15 through the housing cavity 12 from the housing inlet 20 to the housing outlet 25. The brushes 60, 62 are arranged so that the rotational axis 64, 66 of each brush 60, 62 is substantially parallel to the longitudinal axis 70 of the housing cavity 12. The counterrotating brushes 60, 62 may each comprise a nylon core or longitudinal rotational axis 64, 66 with bristles 72, 74 attached to the core 64, 66 in a helical or auger arrangement.

As shown in FIGS. 3, 4, and 5, the housing cavity 12 has curved longitudinal portions 76, 78 which conform to the shape of the counterrotating brushes 60, 62. The curved cavity portions 76, 78 are formed by inner curved side walls 80, 82, and inner curved bottom walls 84, 86 of the housing 2. The curved side walls 80, 82 connect to inner riser walls 88, 90, respectively. Rotation of the brushes 60, 62 causes the baked good or snack pieces 15 to be driven or swept from the inner curved bottom walls 84, 86 up the adjacent inner curved side walls 80, 82 of the housing 2. This action causes the pieces 15 to tumble or flip as they are transformed between the inlet 20 and outlet 25. In preferred embodiments, the bristles 72, 74 touch or sweep the inner walls 80, 82, 84, 86 of the housing 2 to provide a self-cleaning action and to agitate or tumble any particulate composition which is not adhered to the pieces. The counterrotating brushes 60, 62 agitate and disperse loose or non-adhered particulate composition so that it comes into contact with the pieces 15 as they are transported and tumbled to thereby achieve further adhesion and coverage.

In the embodiment shown in FIG. 1, the housing inlet 20 feeds the baked good or snack pieces 15 to the upstream end of the counterrotating brushes 60, 62 at a point located above the tops of the rotating bristles 72, 74. In other embodiments the inlet may be sized and located for feeding the pieces below, or both above and below the tops of the rotating bristles 72, 74.

The counterrotating brushes 60, 62 may be driven by a conventional variable speed motor drive assembly (not shown) which includes a motor, mounted outside of the housing, and belts, pulleys, or gears operatively connected to the counterrotating brushes 60, 62.

A commercially available lower housing 38 equipped with counterrotating brushes 60, 62, motor drive assembly, and curved channels or cavities 76, 78 which conform to the cylindrical shape of the brushes 60, 62 which may be used in the present invention is a Transitube snack coating device produced by Transitube Projet, Aix-en-Provence, France and sold by American Snack Coating Company, 661 SE 5th Street, Pompano Beach, Fla. 33060. The commercially available lower housing 38 may be modified to accommodate a particulate composition dispenser 35 in accordance with the present invention by removing its top covers and inserting, fastening, or otherwise securing the raised portion or hood 30 to the top 4 of the lower housing 38.

The particulate dispenser 35 is mounted above the counterrotating brushes 60, 62 for dispensing a particulate composition as a curtain or sheet 92 which extends in the direction of the longitudinal axis 70 of the housing cavity 12 so that it is dispensed upon the tumbling pieces 15 for a substantial distance along the longitudinal axis 70. In preferred embodiments of the invention, the particulate dispenser 35 comprises an elongated nozzle 32 which extends substantially the entire length of the raised portion or hood portion 30 of the housing 2. The nozzle outlets 94 are preferably located or aligned directly above the longitudinal axis 70 of the housing cavity 12. Both the longitudinal axis 96 of the nozzle 32 and the longitudinal axis 70 of the housing cavity 12 may be centrally located with respect to the side walls 8, 10, 42, 44 of the housing 2 and with respect to the rotational axes 64, 66 of the counterrotating brushes 60, 62.

The dispenser nozzle 32 is located at a height which permits the curtain or sheet 92 of particulate composition to disperse in a direction transverse to the longitudinal axis 70 of the housing cavity 12 as the composition descends towards the baked good or snack pieces 15. Height adjustment my be achieved by raising or lowering the hood 30 with respect to the lower housing portion 38. Height adjustment may also be achieved by raising or lowering the nozzle 32 with respect to the hood 30. The former adjustment method is preferable in terms of sealing the housing 2 to reduce escape of airborne particulate composition. The nozzle 32 may be supported at its upstream end by means of a support bracket 97 located within the hooded portion 30 of the housing 2.

In preferred embodiments of the invention, the dispenser nozzle 32 includes a plurality of adjustable openings 94 along its length for providing a substantially uniform mass flow rate of particulate composition along the length of the curtain or sheet 92. As shown in FIGS. 3 and 6, the adjustable openings 94 may each comprise an inner slot 98 and an outer slot 100. Each outer slot 100 may be located in an individually rotatable sleeve or collar 102. Rotation of the sleeve 102 and its slot 100 relative to the inner slot 98 may be used to change the width of the inner slot 98 which is covered by the sleeve 102. The mass flow rate of the particulate composition through each nozzle opening 94 may therefor be varied by rotation of the sleeve or collar 102.

The inner slots 98 are preferably located within a tubular member 104 which includes a feed screw, helix, auger, or pigtail feeder 106 for transporting the particulate composition to the inner slots 98 from a particulate feed hopper 110. The feed screw 106 transports the particulate composition through the tubular member 104 for dispensing through the adjustable openings 94. The feed screw 106 may be driven by conventional direct or indirect motor drives (not shown). The particulate feed hopper 110, drive for the feed screw 106, and a portion of the tubular member 104 are located outside of the hosing 2 as shown in FIGS. 1 and 2. In the embodiment shown in FIGS. 1 and 2, the particulate composition is fed through the nozzle 32 countercurrently to the direction of transport 120 of the substrate pieces 15 through the housing cavity 12.

The dispenser 35 is preferably equipped with a top lid 112 for the feed hopper 110. The top lid 112 may be secured to the hopper 110 by means of clamps or other fastening devices (not shown) for preventing the escape of or contamination of the particulate composition. The dispensing device 35 also preferably includes a feed hopper agitator (not shown) for assisting in the supply of a constant flow rate of the particulate composition to the feed screw 106. The dispenser 35 preferably includes adjustable legs 114 and a support 116 for the downstream end of the nozzle 32. The dispenser 35 may be located on a support 118 above the lower housing 38.

The nozzle 32 passes through the downstream end 48 of the raised portion or hood 30 of the housing 2. The passageway in the downstream end 48 through which the nozzle 32 passes may be sealed around the periphery of the nozzle 32 using a conventional O-ring or sleeve (not shown). The sleeve may also be used to secure the nozzle 32 by means of bolts or screws to the end wall 48.

Exemplary agitated feed hoppers for feeding granular material to a feed screw in the bottom of the hopper which may be used are disclosed in U.S. Pat. No. 5,160,016 to Moksnes. Commercially available dispensers which include a feed hopper and a nozzle having adjustable slotted openings for creating a curtain or sheet of particulate composition which may be used are produced by AccuRate, Inc., Whitewater, Wis.

The outer nozzle slots 100 may have a width of about 3/8" and a length of about 4 3/4". The slots 100 in the outer sleeves 102 may be spaced about 1/4" apart. The inner slots 98 may have the same dimensions and spacing as the outer slots 100. In other embodiments, a single elongated slot may be used in the inner tube 104, rather than a plurality of individual slots 98. The slot or slots 98 of the inner tube 104 preferably have their central longitudinal axes aligned along the bottommost portion of the cylindrical tube 104 as shown in FIG. 3.

Even though the nozzle 32 contains individual slots 98, 100, they are closely spaced together so that the individual curtain from each slot 98, 100 disperses longitudinally so that a single sheet or curtain 92 of the particulate composition is formed a relatively short distance below the nozzle openings 94, the sheet 92 extending substantially the entire length of the generally horizontal nozzle 32 and hood 30. As the particulate composition descends towards the substrate pieces 15, the curtain or sheet 92 disperses in a direction 126 transverse to the longitudinal axis 70 of the cavity 12 and transverse to the direction of flow 120 of the substrate pieces 15 through the cavity 12. The transverse extent of dispersion, or the width of the curtain 92 may expand to the width of the housing cavity 12 in the area adjacent to the tops of the brushes 60, 62 as shown in FIG. 3.

The counterrotating brushes 60, 62 may be configured so that the baked good or snack pieces 15 are transported and tumbled substantially completely below the rotational axes 64, 66 of the brushes 60, 62 at brush rotation rates which do not adversely affect product integrity. The pitch, or distance between the threads of each brush may, for example, range from about 8" to about 16" for a brush length of about 8 feet to about 12 feet.

The length of the slotted portion of the nozzle 32, and the length of the curtain or sheet 92 of particulate composition dispensed from the nozzle, may range from about 20% to about 50%, preferably about 25% to about 40%, of the length of the rotating brushes. For example, the length of the dispensing portion of the nozzle 32 and the length of the curtain 92 may be about 4 feet for a brush length of about 10 feet. The nozzle openings 94 may, for example, be disposed at a distance of at least about 12" above the top 4 of the lower housing 38 in which a 10 foot long pair of counterrotating brushes 60, 62 are disposed.

The particulate composition dispenser 35 is located, in embodiments of the present invention, downstream of the baked good or snack inlet 20 a sufficient distance so that the counterrotating brushes 60, 62 have initiated rambling and flipping of the pieces by the time they encounter contact with the curtain 92 of particulate composition. Also, the downstream location of the particulate composition relative to the baked good or snack inlet 20 helps to prevent losses of airborne particulates through the inlet 20. In preferred embodiments of the invention, vacuum hoods 122, 124 are provided at the baked good hopper 18 and at the baked good outlet 25 for the capture of any airborne particulate composition escaping from the housing 2.

In accordance with the method of the present invention, baked good pieces or snack pieces 15 which may have a spray oil, reduced fat, low-fat, or non-fat adhesive sprayed or coated on the top and bottom surfaces of the pieces 15 may be transported by means of a conveyor (not shown) to the inlet hopper 18 of the topping applicator 1 of the present invention. The spraying may be performed in conventional manner with top and bottom spraying of the baked pieces as they are transported on a mesh belt. The pieces 15 entering the hopper 18 are then transported from the baked good inlet 20 towards the baked good outlet 25 in the direction shown by arrow 120 while being tumbled and flipped by the counterrotating brushes 60, 62.

In the present invention, substantially uniform application or coverage of the tops and bottoms of the pieces 15 by the particulate composition is achieved on a consistent basis by dispersing the composition over a large area without pressurized air and without substantial loss of topping or particulate composition to the atmosphere. The particulate dispenser 35 mounted above the brushes 60, 62 dispenses the particulate, free-flowing composition as a curtain or sheet 92 upon the tumbling pieces 15 for a substantial distance in the direction of transport 120 of the pieces 15 from the inlet 20 towards the outlet 25. The curtain or sheet 92 as a substantially uniform mass flow rate along its length. The curtain or sheet 92 disperses towards side walls 8, 10 or riser walls 88,90. As shown in FIG. 3 this dispersion is in a direction 126 transverse to the direction of travel 120 of the pieces 15 from the inlet 20 to the outlet 25 as they approach the air currents created by the counterrotating brushes 60, 62. The pieces 15 are also tumbled and flipped in a direction which is primarily transverse to their direction of transport 120 between the inlet 20 and outlet 25.

The products 15 containing the particulate composition adhered to its surfaces may be permitted to fall from the outlet 25 onto a conveyor 128 for transport to a packaging operation (not shown).

The particulate composition applicator 1 may be mounted upon a portable or movable frame 130 for removal from the manufacturing line for cleaning purposes, changes in topping compositions, or for use on other product lines.

The apparatus and method of the present invention may be used for topically applying a particulate composition substantially uniformly to both the top and bottom surfaces of baked good pieces 15, such as crackers, biscuits, wafers, crisp breads, and sweet or savory snacks, chips, or chip-like products such as fabricated potato chips, pretzel chips, corn chips, and the like. The substrates may be full fatted products, reduced fat, low-fat, or no-fat products such as low-fat potato chips, no-fat crackers, and the like.

Exemplary particulate compositions which may be topically applied to the baked good or snack pieces 15 in accordance with the present invention include flavorings, seasonings, condiments, colorants, odorants, confections, and mixtures thereof. The toppings may be heat sensitive ingredients such as vitamins, medicaments, minerals, nutritive supplements, dried vegetables, herbs, spices, and mixtures thereof. The particulate compositions may be in finely granulated form, powdered form, seed form, or low specific gravity forms such as dried vegetable flakes, herb flakes, condiment flakes, or fruit flakes, and minutes thereof. The particles of the toppings such as the flakes may be readily visually apparent upon the finished product. Exemplary toppings my include granulated ingredients such as salt, onion salt, garlic salt, sweeteners or sugars, in combination with flakes such as pepper, basil, thyme, peppermint, dried tomato, bran, parsley, and mixtures thereof, such as an onion/garlic/parsley seasoning having a particle size distribution of about 75% passing through a #40 Tyler mesh, and having a bulk density of about 40 lbs./cu.ft. Exemplary powdered toppings include cheese powders, barbeque, sour cream and onion, and sweeteners.

In embodiments of the invention, the particle size of the particulate composition may include a substantial proportion, for example 10% by weight or more, of particles which are sufficiently light so as to become airborne or carried by gentle air currents. Exemplary particle size distributions may be at least about 15% by weight being retained on a #40 Tyler mesh screen. Exemplary bulk densities may range from about 25 to about 55 lbs./cu.ft.

The moisture content of the particulate toppings or seasonings is generally less than about 10% by weight, most often less than about 5% by weight, preferably less than about 3% by weight. The baked good or snack pieces to which the toppings are applied generally have a moisture content of less than about 5% by weight, preferably less than about 3% by weight.

What is claimed is:

1. Apparatus for the topical application of a particulate composition to a plurality of baked good pieces comprising:
    a) a housing having a top wall, a bottom wall, and two opposing longitudinal side walls for forming a longitudinal cavity having a longitudinal axis, an inlet for receiving baked good pieces into said cavity and, an outlet for discharging the baked good pieces from said cavity,
    b) counterrotating brushes located within said housing for transporting and tumbling baked good pieces through the housing cavity from said inlet to said outlet, said brushes each having a rotational axis substantially parallel to said longitudinal axis of said housing cavity,
    c) a particulate dispenser mounted above said brushes for dispensing a particulate composition from a nozzle located within said housing as a curtain or sheet, said curtain extending in the direction of said longitudinal axis so that the particulate composition is dispensed upon said tumbling pieces for a substantial distance along said longitudinal axis to apply said particulate composition substantially uniformly to the top and to the bottom of said pieces without substantial escape of airborne particulates from said housing.

2. Apparatus as claimed in claim 1 wherein said brushes are configured so that said baked pieces are transported and tumbled below the rotational axes of said brushes.

3. Apparatus as claimed in claim 1 wherein said housing has a raised portion for permitting said curtain or sheet to disperse in a direction transverse to said longitudinal axis of said housing cavity as said composition descends towards said baked good pieces.

4. Apparatus as claimed in claim 3 wherein said housing has a lowered portion downstream of said raised portion for preventing escape of airborne particulate composition to the atmosphere through said outlet.

5. Apparatus as claimed in claim 3 wherein said nozzle is disposed within said raised portion, and includes a plurality of adjustable openings along its length for providing a substantially uniform mass flow rate of particulate composition along the length of said curtain or sheet.

6. Apparatus as claimed in claim 5 wherein said adjustable openings each comprise an inner slot and an outer slot, said outer slot being located in a rotatable sleeve, said outer slot being rotatable relative to said inner slot so that the width of said inner slot which is covered by said sleeve may be varied to control the mass flow rate of the particulate composition through each nozzle opening.

7. Apparatus as claimed in claim 6 wherein said inner slots are located within a tubular member, and said tubular member includes a feed screw for transporting the particulate composition through the tubular member for dispensing through said adjustable openings.

8. Apparatus as claimed in claim 7 wherein said dispenser includes a hopper for supplying particulate composition to said tubular member, and a drive for said feed screw, said hopper and said drive being located outside of said housing.

9. Apparatus as claimed in claim 6 wherein said raised portion includes a lid for access to said nozzle.

10. Apparatus as claimed in claim 1 wherein said cavity comprises curved side and bottom portions which conform to the shape of said brushes so that rotation of said brushes causes baked good pieces to be driven or swept up the inner walls of the sides of said housing to cause the pieces to tumble or flip.

11. Apparatus as claimed in claim 1 wherein a baked good hopper is provided for feeding baked good pieces to said baked good inlet, said baked good inlet is located upstream of said particulate composition dispenser, and a vacuum hood is provided at said baked good hopper and at said baked good outlet for the capture of any airborne particulate composition escaping from said housing.

* * * * *